United States Patent [19]

Myers

[11] Patent Number: 5,595,079
[45] Date of Patent: Jan. 21, 1997

[54] MOTORCYCLE STEERING LOCK

[75] Inventor: Gary L. Myers, Monee, Ill.

[73] Assignee: Fort Lock Corporation, River Grove, Ill.

[21] Appl. No.: 358,833

[22] Filed: Dec. 19, 1994

Related U.S. Application Data

[63] Continuation-in-part of Ser. No. 20,989, Apr. 6, 1994, Pat. No. Des. 369,536.

[51] Int. Cl.⁶ ..................................................... B62H 5/00
[52] U.S. Cl. ............................... 70/233; 70/185; 70/215
[58] Field of Search ...................... 70/181–187, 209–211, 70/215–218, 233, 379 R; 307/10.2–10.6; 180/287

[56] References Cited

U.S. PATENT DOCUMENTS

| | | | |
|---|---|---|---|
| 1,076,835 | 10/1913 | Lyons | 70/185 X |
| 1,408,652 | 3/1922 | Steinberg | 70/185 |
| 1,460,015 | 6/1923 | Cappellari | 70/185 X |
| 1,542,560 | 6/1925 | Krautier | 70/185 |
| 1,776,881 | 9/1930 | Birdsall | 70/217 |
| 2,098,189 | 11/1937 | Kistner | 70/185 X |
| 2,544,590 | 3/1951 | Dyson et al. | 70/233 |
| 2,625,813 | 1/1953 | Hinds | 70/233 X |
| 4,179,908 | 12/1979 | Schaumburg | 70/185 |
| 4,773,241 | 9/1988 | Peitsmeier et al. | 70/185 X |
| 5,279,137 | 1/1994 | Orbell | 70/233 X |

FOREIGN PATENT DOCUMENTS

| | | | |
|---|---|---|---|
| 1240060 | 7/1960 | France | 70/185 |
| 2910295 | 9/1980 | Germany | 70/215 |
| 234749 | 3/1942 | Switzerland | 70/215 |
| 144156 | 6/1920 | United Kingdom | 70/185 |
| 2182706 | 5/1987 | United Kingdom | 70/379 R |

*Primary Examiner*—Suzanne L. Dino
*Attorney, Agent, or Firm*—Leydig, Voit & Mayer, Ltd.

[57] ABSTRACT

An improved motorcycle steering lock assembly smoothly and reliably operates to immobilize the rotating shaft upon which the handle bars and front wheel forks are installed. The lock, mounted in front of the motorcycle seat and in close proximity to the handle bars and rotating shaft, selectively engages a receiving detent in the rotating shaft so as to prevent rotation of the steering assembly when the motorcycle is not in use. In particular, the steering lock assembly of the present invention comprises: a housing having a shell portion at one side and a base portion at the opposite side; a lock plug assembly rotably disposed in the shell portion of the housing and having a spindle which rotates when the lock plug is turned by a key; a locking bolt slidably disposed in a projecting sleeve in the base portion; a movable bolt means for selectively positioning the bolt between an engaged position wherein the bolt extends beyond the sleeve of the base portion of the housing (so that the bolt can engage the receiving detent of the rotating shaft) and a disengaged position wherein the bolt is fully retracted within the sleeve (so that the bolt cannot engage the receiving detent); and a drum operated camming means coupled to the lock plug spindle and rotably mounted in the housing for linearly actuating the movable bolt means.

28 Claims, 5 Drawing Sheets

(INVERTED)

5,595,079

MOTORCYCLE STEERING LOCK

This is a continuation-in-part application of U.S. application Ser. No. 29/020,989, filed on Apr. 6, 1994 and now U.S. Pat. No. Des. 369,536.

BACKGROUND OF THE INVENTION

1. Field of the Invention

The present invention relates generally to locks, and, more particularly, concerns a steering lock which immobilizes the front steering assembly of a motorcycle. The front steering assembly comprises a rotatable steering shaft upon which a set of handle bars and a front wheel fork are mounted.

2. Description of the Prior Art

Conventional prior art steering locks have a locking bolt which selectively engages a receiving detent in the rotating shaft of the motorcycle. In use, a key rotates the lock, the turning of the lock actuates the locking bolt, and the locking bolt engages the receiving detent. When the locking bolt properly engages the detent, neither the handle bars nor the rotating shaft can be turned. In theory prior art steering locks function dependably. In reality, however, conventional steering locks tend to function rather crudely, erratically, and unreliably.

OBJECTS AND SUMMARY OF THE INVENTION

The primary object of the present invention is to provide an improved key operated motorcycle steering lock assembly which operates in a smooth and reliable way to immobilize the front steering assembly of a motorcycle.

Another object of the present invention is to provide a motorcycle steering lock in which the locking bolt self-aligns within the locking bolt sleeve during operation.

Still another object of the present invention is to provide a motorcycle steering lock in which the locking bolt is spring loaded and snaps-in-place to dependably engage the receiving detent in the rotating shaft.

A further object of the present invention is to provide a motorcycle steering lock assembly with several redundancy features which ensure that the locking bolt remains retracted when in the disengaged (or unlocked) position and extended when in the engaged (or locked) position.

Yet another object of the present invention is to furnish a motorcycle steering lock which prevents over-rotation of the lock.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 6:
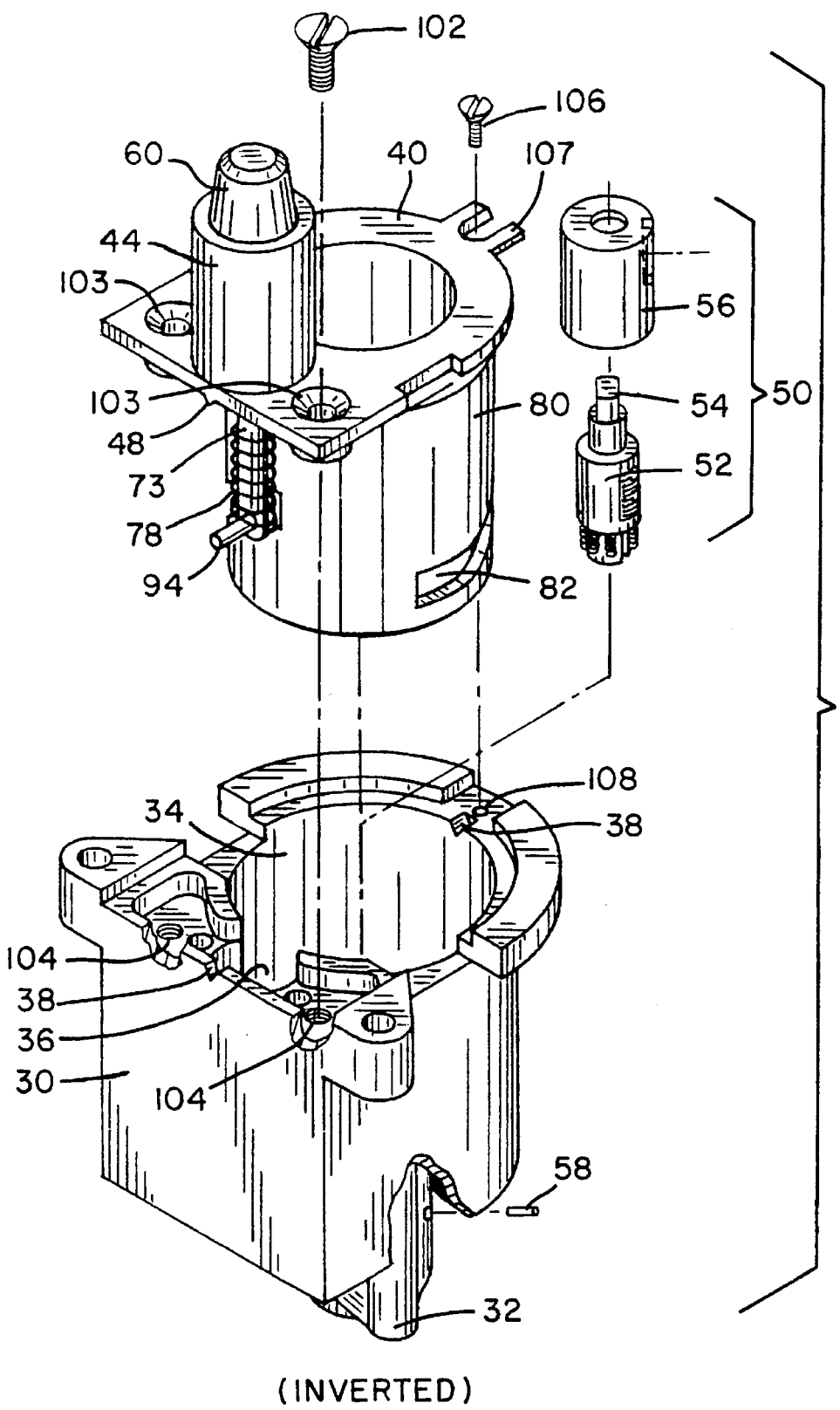
FIG. 6 is an inverted, exploded perspective view of the lock assembly, exposing the internal component parts.
Figure 7:
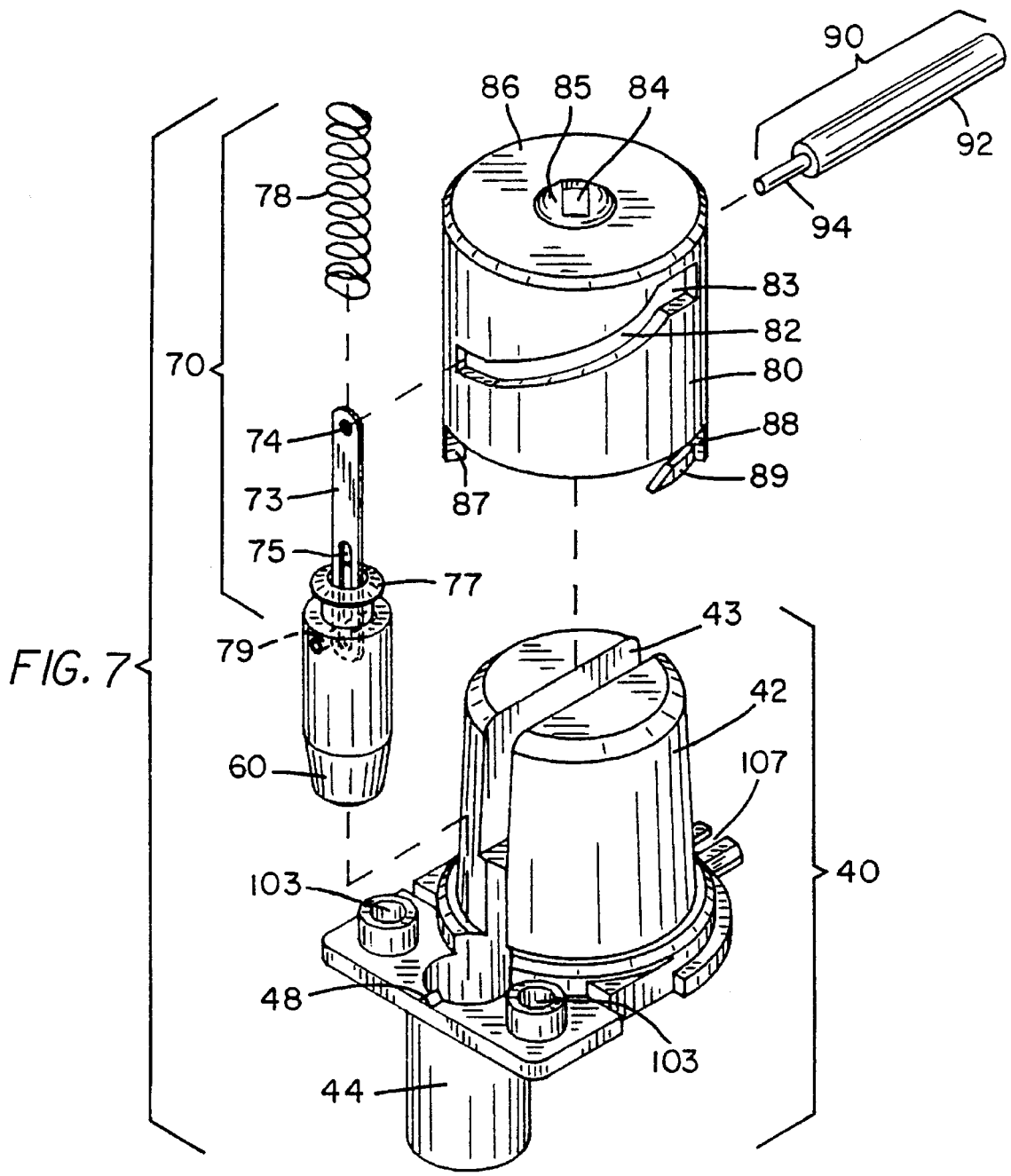
FIG. 7 is a non-inverted, exploded perspective view of the lock assembly, exposing the internal component parts.
Figure 8:
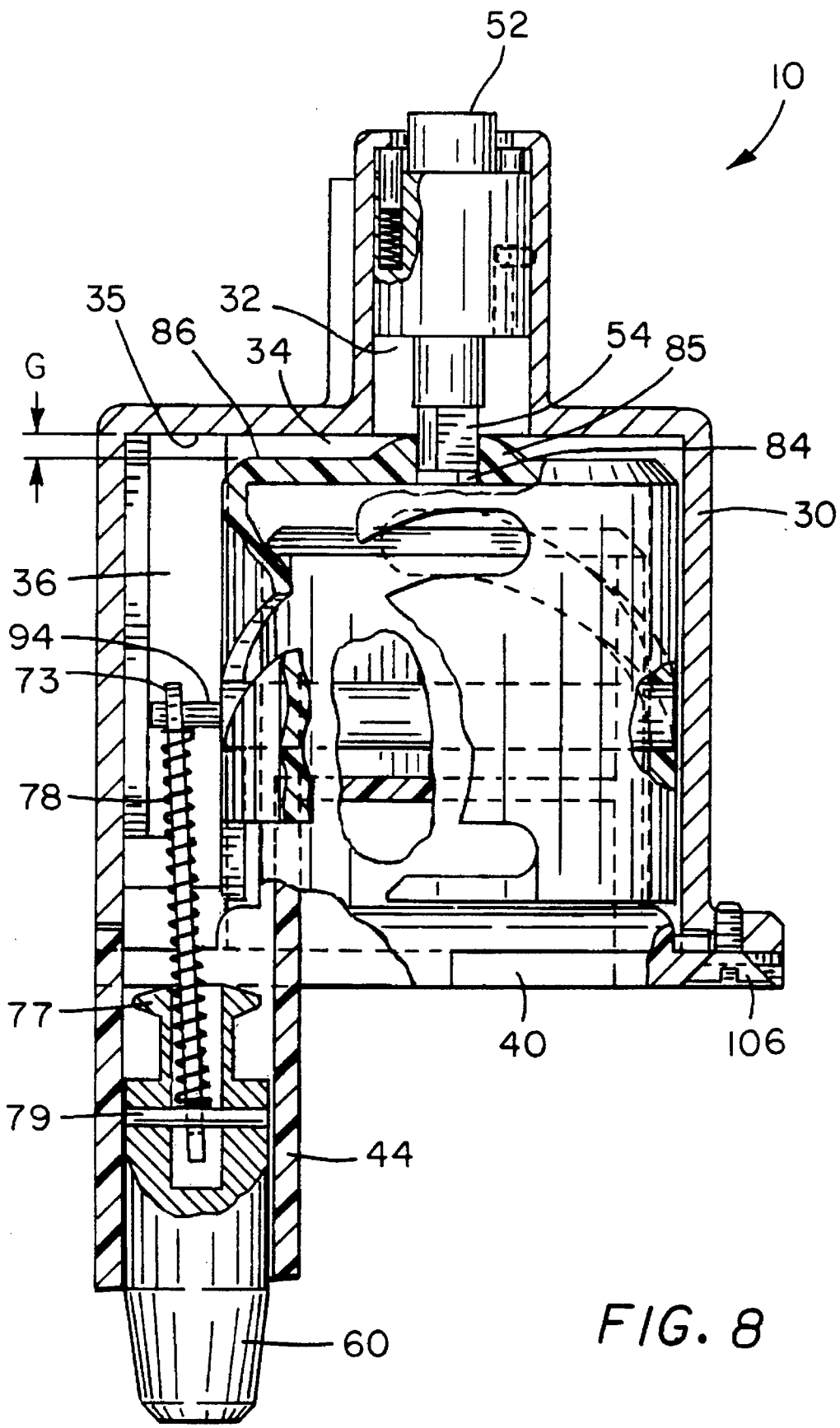
FIG. 8 is a fragmentary cross-sectional view of the lock assembly taken along line 8—8 in FIG. 3, with the locking bolt in the engaged (or locked) position.

Referring now specifically to the drawings, the present invention, an improved motorcycle steering lock assembly, is generally designated by reference numeral 10 and broadly comprises: an outer housing 20; a lock plug assembly 50; a locking bolt 60; a movable bolt means 70; and a drum operated camming means 80. The external parts and features of the steering lock assembly 10 are most clearly shown in FIGS. 1–5, while the internal component parts are best depicted in FIGS. 6–8. In all drawings, it will be understood that the steering lock assembly 10 is shown either during or after assembly, but prior to installation onto a motorcycle (not shown).

Referring first to FIGS. 1–5, the outer housing 20 shields the internal lock components from the environment and comprises a shell portion 30 and a base portion 40. In the illustrated embodiment, the shell portion 30 houses the lock plug assembly 50, the drum operated camming means 80, and the movable bolt means 70, while the base portion 40, and in particular a projecting sleeve 44, houses the locking bolt 60. It will be appreciated that in operation, rotation of the lock plug assembly 50 by a key (not shown) actuates the locking bolt 60 which selectively engages a receiving detent in the rotating shaft of the motorcycle. When the locking bolt 60 engages the detent, the front steering assembly of the motorcycle is completely immobilized and the handle bars cannot be turned.

As best shown in FIG. 6, the shell portion 30 of the outer housing 20 has three main compartments or cavities. A first compartment 32 is disposed on top of the shell portion 30 and houses the lock plug assembly 50. A second intermediate compartment 34 is disposed inside the shell portion 30 and houses the drum operated camming means 80. The second compartment 34 is generally cylindrical in shape and has a slightly greater diameter than the outer diameter of the camming means 80. A third compartment 36 is also disposed inside the shell portion 30 and houses the movable bolt means 70. The third compartment 36 is also generally cylindrical in shape and is longitudinally connected to the second compartment 34. It will be understood that the second compartment 34 is connected to the first compartment 32 via a small aperture (not shown).

Figure 2:
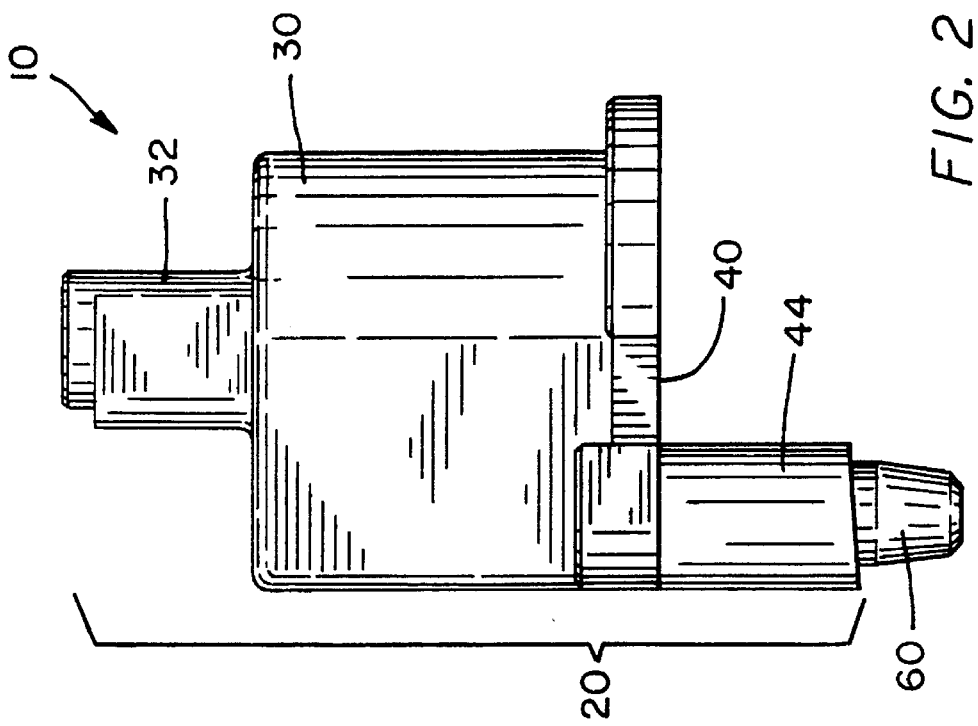
FIG. 2 is a side view of the lock assembly, with the locking bolt in the engaged (or locked) position.
Figure 1:
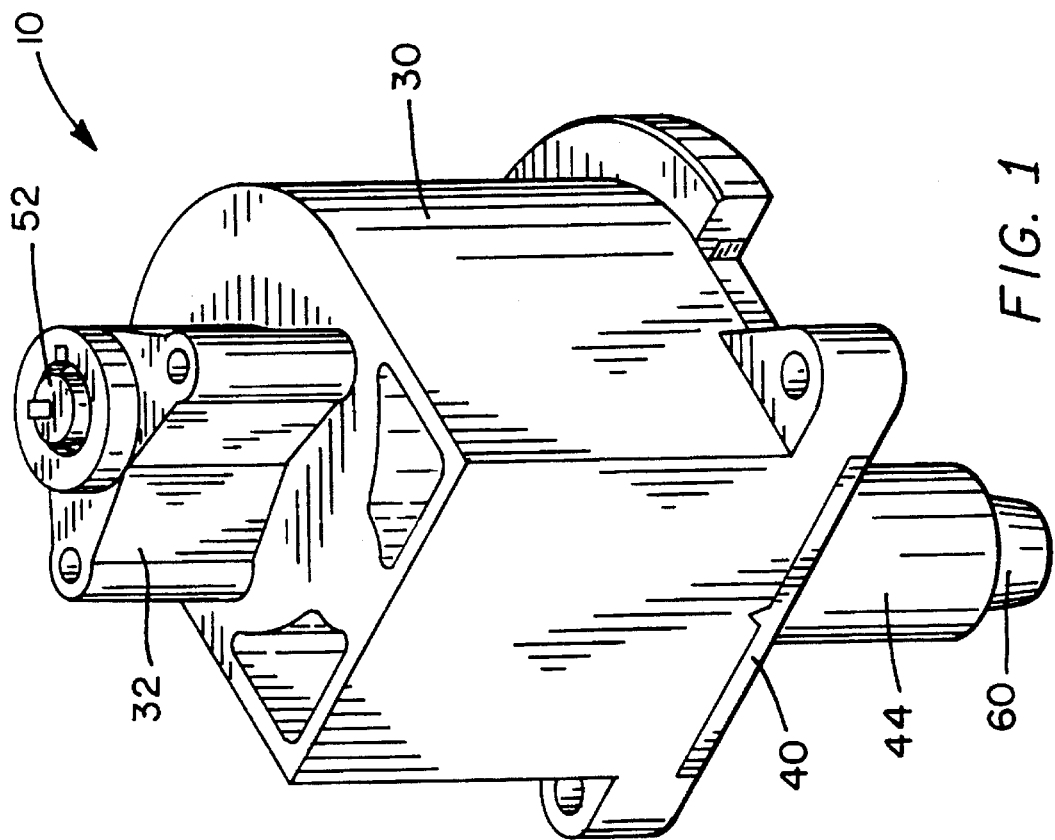
FIG. 1 is a perspective view of the lock assembly, with the locking bolt in the engaged (or locked) position.
Figure 4:
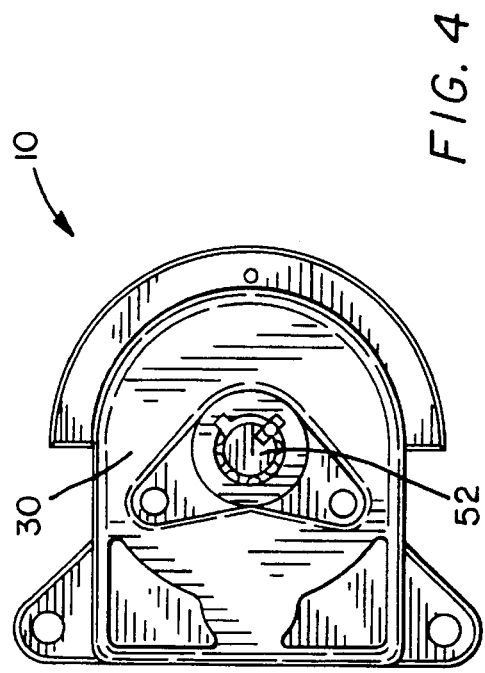
FIG. 4 is a top view of the lock assembly.
Figure 5:
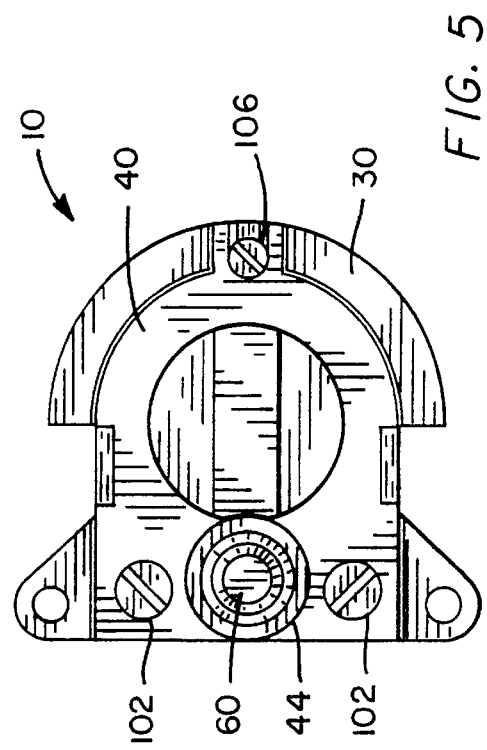
FIG. 5 is a bottom view of the lock assembly.
Figure 3:
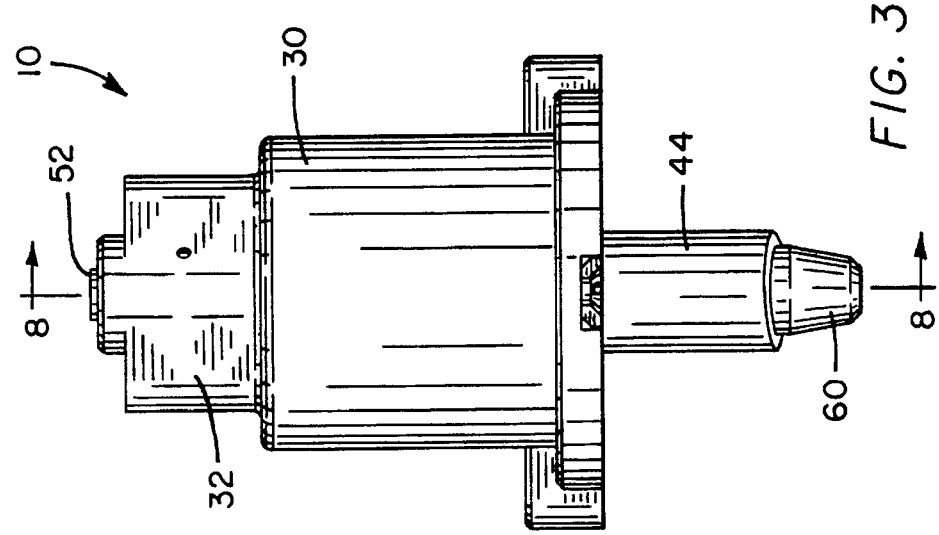
FIG. 3 is a front view of the lock assembly, with the locking bolt in the engaged (or locked) position.

The base portion 40, depicted in FIG. 7, is disposed at the opposite side of the housing 20 as the shell portion 30, and comprises a generally cylindrical projecting sleeve 44 and a drum insert 42. The locking bolt 60 is slidably disposed in the sleeve 44 and can be selectively positioned between an engaged (or locked) position, in which the locking bolt 60 extends beyond the bolt sleeve 44 of the shell portion 30, as depicted in FIGS. 1–3, and a disengaged (or unlocked)

position in which the locking bolt 60 is fully retracted within the sleeve 44. Pursuant to the invention, the bolt sleeve 44 has a slightly greater inner diameter than the outer diameter of the locking bolt 60 such that the bolt 60 can translate along the sleeve 44 in a smooth and reliable manner.

In the illustrated embodiment, the shell portion 30 of the outer housing 20 is assembled to the base portion 40 by a plurality of bolts 102, 106. As shown in FIG. 6, the bolts 102, 106 are first inserted through holes and/or slots 103, 107 in the base portion 40 and are then screwed into the threaded engagement holes 104, 108 in the shell portion 30. The base portion 40 also has an alignment tab 48 which engages an alignment notch 38 in the shell portion 30. This tab-notch interface ensures proper alignment between these two parts during assembly.

As best shown in FIG. 6, the lock plug assembly 50 is disposed in the first compartment 32 of the shell portion 30 and comprises a lock plug 52, a spindle 54, and a lock plug housing 56. The lock plug assembly 50 is secured in place in the first compartment 32 by an alignment pin 58. It will be appreciated that the spindle 54 extends through the aperture disposed between the first and second compartments 32, 34 and engages the top of the drum operated camming means 80. Thus, when the lock plug assembly 50 is rotated by the key, the camming means 80 is also rotated.

The drum operated camming means 80 is provided for linearly actuating the movable bolt means 70 when the lock plug assembly 50 is rotated by the key. In particular, as the camming means 80 is rotated, the camming means 80 actuates the movable bolt means 70 which selectively positions the locking bolt 60 between the engaged (or extended) and disengaged (or retracted) positions. It will be understood that the locking bolt 60 mates with the aforementioned receiving detent and locks the rotating shaft of the motorcycle when in the engaged position.

In the illustrated embodiment, the camming means 80 comprises a drum which is basically a cylinder, having a bore therein, with a flat, circular, top surface 86. Located at the center of the top surface 86 is a spindle slot 84 where the spindle 54 of the lock plug assembly 50 engages and rotates the drum 80. As depicted in FIGS. 7 and 8, the spindle slot 84 is positioned within a protuberance or lip 85 which extends slightly above the top surface 86 of the drum 80. The protuberance 85 produces a slight gap G between the top surface 86 of the drum 80 and the flat, inner surface 35 of the second compartment 34. The gap G significantly reduces the turning friction between rotating drum 80 and the stationary outer housing 20 by decreasing the effective contact area between these two parts.

The drum 80 is rotably mounted on the drum insert 42 of the base portion 40 of the housing 20. As shown in FIG. 7, the drum insert 42 is an integral part of the base portion 40 and, like the drum 80, is generally cylindrical in shape. Although the drum 80 is mounted on the drum insert 42 (which is part of the base portion 40), the drum 80 is disposed such that it rotates inside of the second compartment 34 of the shell portion 30. The drum insert 42 also has a groove 43 positioned along a diameter of the drum insert 42 and aligned with the movable bolt means 70.

The drum 80 also has a pair of partial, diametrically opposed, angled cam slots 82 which extend through the cylindrical periphery of the drum 80. Each slot 82 is generally helical in nature and both are oriented at an angle relative to the top portion 86 of the drum 80. In the illustrated embodiment, the cam slots 82 have two horizontal end segments 83, located at either end of the both cam slots 82, which correspond to the engaged and disengaged positions, respectively. In operation, the horizontal end segments 83 provide the steering lock assembly 10 with a redundancy feature which ensures that the locking bolt 60 remains fully retracted when in the disengaged position and fully extended when in the engaged position.

A cam follower 90, having a generally cylindrical peg portion 92 and a smaller diameter pin portion 94, is provided to couple the drum 80 to the movable bolt means 70. As depicted in FIG. 7, the cam follower 90 is inserted through the two cam slots 82 in the drum 80 and through the groove 43 in the drum insert 42. Properly assembled, the two ends of the larger peg portion 92 contact the two diametrically opposed cam slots 82, and the pin portion 94 extends beyond the outer diameter of the drum 80 such that it can be joined to the movable bolt means 70.

In operation, as the spindle 54 of the lock plug assembly 50 rotates the drum operated camming means 80, the cam follower 90 traverses along the helical cam slots 82 while vertically translating within the stationary drum insert groove 42. Throughout this rotational process, the cam slots 82 linearly actuate the cam follower 90 vertically (up-and-down) while the drum insert groove 43 keeps the cam follower 90 properly aligned.

The movable bolt means 70 is provided for selectively positioning the locking bolt 60 between the engaged and disengaged positions. As shown in FIGS. 7 and 8, the movable bolt means 70 is coupled to both the pin portion 94 of the cam follower 90 and the locking bolt 60. In operation, as the drum operated camming means 80 is rotated and the cam follower 90 is actuated, the movable bolt means 70 translates in the third compartment 36 of the shell portion 30 while linearly actuating the connected locking bolt 60 within the sleeve 44 of the base portion 40.

In particular, the illustrated embodiment of the movable bolt means 70 comprises: a reversible link 73; a retaining pin 79; an insert ring 77; and a helical compression spring 78. The link 73 has a lengthwise slot 75 and a circular hole 74, with the slot 75 being disposed near one end of the link 73 and the hole 74 near the other end. As best depicted in FIG. 7, the locking bolt 60 has a short cavity disposed at the end of the bolt 60 which does not engage the detent. In the illustrated embodiment, the locking bolt 60 is pivotably coupled to the link 73 by placing the end of the link 73 with the slot 75 all the way into the bolt cavity and inserting the retaining pin 79 through both the locking bolt 60 and the link slot 75. The insert ring 77, either as a separate component or as an integral part of the locking bolt 60, is then installed around the link 73 and is affixed to the cavity end of the locking bolt 60. Next, the spring 78 is placed around the link 73 and the pin portion 94 of the cam follower 90 is inserted through the hole 74 in the link 73 to couple the movable bolt means 70 to the cam follower 90. Properly assembled, the spring 78 is compressibly disposed between the retaining pin 79 and the pin portion 94, as shown in FIG. 8. This first link arrangement enables the locking bolt 60 to pivot relative to the link 73 but does not permit the link 73 to slide relative to the pin portion 94 of the cam follower 90.

Alternatively, the locking bolt 60 can be both slidably and pivotably attached to the link 73 simply by reversing the orientation of the link 73 such that the retaining pin 79 is inserted through the link hole 74 and the pin portion 94 of the cam follower 90 is inserted through the link slot 75. Unlike the first link arrangement discussed above, this second (reversed) link arrangement, enables the link 73 to slide relative to the pin portion 94 of the cam follower 90.

In addition, the compression spring 78, in conjunction with the slidable nature of the link 73, provides the movable bolt means 70 with a "spring biasing" feature which tends to keep the movable bolt means 70 fully elongated. Normally, the spring 78 forces the pin portion 94 of the cam follower 90 to the very end of the link slot 75. However, if sufficient axial force is applied to the locking bolt 60 to overcome the spring 78, the link 73 can translate relative to the pin portion 94 of the cam follower 90. Thus, even if the lock plug assembly 50 and the camming means 80 are in the engaged (or extended) position, the locking bolt 60 can remain retracted if enough force is applied to the locking bolt 60 to counteract the spring biasing provided by the spring 78.

Notwithstanding the above discussion, it will be understood that other embodiments of the movable bolt means 70 are feasible, including a single, unitary locking bolt 60 of sufficient length.

The plurality of components which comprise the illustrated embodiment of the movable bolt means 70, interact with each other and with other lock components to provide some of the features and advantages of the present invention. First, since the locking bolt 60 is pivotably attached to the link 73, the locking bolt 60 is always properly aligned within the bolt sleeve 44. This "alignment" feature ensures that the locking bolt 60 is correctly oriented within the bolt sleeve 44 during all phases of operation. For instance, when the locking bolt 60 is in the engaged (or extended) position, the link 73 is at a slight angle relative to the locking bolt 60, as depicted in FIG. 8. Conversely, when the locking bolt 60 is in the disengaged (or retracted) position the link 73 tends to straighten out relative to the locking bolt 60. Thus, the locking bolt 60 is always correctly aligned within the locking bolt sleeve 44, even though the connecting link 73 may not be. This "alignment" feature permits a tighter-than-normal fit between the outer diameter of the locking bolt 60 and the inner diameter of the sleeve 44 and ensures that locking bolt 60 motion and engagement is not only smoother, but more reliable.

Next, the second (slidable, reversed) link arrangement, as mentioned above, provides the movable bolt means 70 with a "spring biasing" feature which enables the locking bolt 60 to snap-in-place and dependably engage the receiving detent in the rotating shaft. For example, if the detent is not quite aligned with the locking bolt 60 during locking, the spring biasing permits the locking bolt 60 to remain retracted until the rotating shaft of the motorcycle is swiveled into proper alignment with the locking bolt 60, and, once properly aligned, the locking bolt 60 will snap or spring into locking engagement with the detent. This "spring biasing" feature also helps ensure that the locking bolt 60 remains fully extended and engaged with the detent when the steering assembly is in the locked position.

Third, the insert ring 77—in conjunction with two drum stops 87, 88—interact to provide the steering lock assembly 10 with a "redundancy" feature which prevents drum 80 over-rotation. As illustrated in FIG. 7, the drum stops 87, 88 are simply the two end portions of a single notch or slot formed into the bottom portion of the drum 80 where the insert ring 77 would otherwise contact the drum 80. In particular, the first drum stop 87 corresponds to the engaged (or locked) position and the second drum stop 88 corresponds to the disengaged (or unlocked) position. Like the cam slots 82, the two drum stops 87, 88 define the maximum permissible angular scope or sweep of drum 80 rotation and prevents the drum 80 from rotating beyond either the locked or unlocked positions. In the illustrated embodiment, the second drum stop 88 also includes an engagement ridge 89 having a ramped engagement portion and a slightly elevated flat recess portion. In operation, as the locking bolt 60 approaches the disengaged position, the engagement ridge 89 contacts and slightly lifts the insert ring 77, and, similar to the top horizontal end segment 83 of the cam slots 82, provides the steering lock assembly 10 with a feature which ensures that the locking bolt 60 will remain retracted when the steering lock 10 is in the unlocked position. In essence, the engagement ridge prevents the insert ring from moving from the disengaged position unless the drum is rotated therefrom.

I claim as my invention:

1. An improved key operated steering lock assembly comprising, in combination:

a housing having a shell portion at one side and a base portion at the opposite side, said base portion including a generally cylindrical drum insert arranged within said shell portion and a hollow projecting sleeve offset from said drum insert;

a lock plug assembly rotatably disposed in said shell portion of said housing, said lock plug assembly having a spindle which rotates when said lock plug assembly is turned by a key;

a locking bolt slidably disposed in said hollow projection sleeve of said base portion;

a movable bolt means for selectively moving said locking bolt between an engaged position wherein said locking bolt extends beyond said hollow projecting sleeve of said base portion and a disengaged position wherein said locking bolt is fully retracted within said hollow projecting sleeve of said base portion; and a drum coupled to said spindle of said lock plug assembly and rotatably mounted on said drum insert such that said drum insert is received within said drum, said drum linearly actuating said movable bolt means when said lock plug assembly is turned by said key.

2. A lock assembly as defined in claim 1 wherein said shell portion of said housing comprises a first compartment wherein said lock plug assembly is disposed, a second intermediate compartment connected to said first compartment wherein said drum is disposed, and a third compartment connected to said second compartment and aligned with said hollow projecting sleeve of said base portion wherein said movable bolt means is disposed.

3. A lock assembly as defined in claim 1 wherein said locking bolt and said hollow protecting sleeve are generally cylindrical in shape.

4. A lock assembly as defined in claim 3 wherein the inner diameter of said hollow protecting sleeve is slightly greater than the outer diameter of said locking bolt.

5. A lock assembly as defined in claim 2 wherein said hollow projecting sleeve of said base portion is offset from said second intermediate compartment of said shell portion.

6. A lock assembly as defined in claim 1 wherein said base portion is coupled to said shell portion by a plurality of bolts.

7. A lock assembly as defined in claim 2 wherein said drum insert is arranged within said second intermediate compartment of said shell portion.

8. A lock assembly as defined in claim 7 wherein said drum insert includes a groove disposed along a diameter thereof and aligned with said hollow projecting sleeve of said base portion.

9. A lock assembly as defined in claim 8 wherein said drum has a bore therein, a cylindrical periphery, and a flat surface on one end.

10. A lock assembly as defined in claim 9 wherein said drum includes a pair of partial, diametrically opposed, angled cam slots which extend through said cylindrical periphery.

11. A lock assembly as defined in claim 10 wherein each angled cam slot includes a pair of horizontal end segments disposed at either end thereof.

12. A lock assembly as defined in claim 9 wherein a spindle slot is formed in said flat surface of said drum, said spindle slot receiving said spindle of said lock plug assembly.

13. A lock assembly as defined in claim 12 wherein said spindle slot is disposed on a lip which extends slightly above said flat surface of said drum.

14. A lock assembly as defined in claim 10 wherein a cam follower is disposed through said angled cam slots of said drum and through said groove of said drum insert.

15. A lock assembly as defined in claim 14 wherein said cam follower includes a protruding end which extends beyond said cylindrical periphery of said drum.

16. A lock assembly as defined in claim 15 wherein said protruding end of said cam follower is coupled to said movable bolt means.

17. A lock assembly as defined in claim 16 wherein said movable bolt means is rigidly attached to said locking bolt.

18. A lock assembly as defined in claim 16 wherein said movable bolt means is pivotably attached to said locking bolt.

19. A lock assembly as defined in claim 16 wherein said movable bolt means is slidably and pivotably attached to said locking bolt.

20. A lock assembly as defined in claim 19 wherein said movable bolt means includes a reversible link having a first end and a second end, the first end of said reversible link having a longitudinal slot formed therethrough and the second end of said reversible link having a circular hole formed therethrough.

21. A lock assembly as defined in claim 20 wherein said locking bolt is slidably attached to said reversible link by inserting said protruding end of said cam follower through said longitudinal slot in the first end of said reversible link.

22. A lock assembly as defined in claim 21 wherein a cavity is formed in an upper end of said locking bolt, said cavity receiving the second end of said reversible link.

23. A lock assembly as defined in claim 22 wherein said locking bolt is pivotably attached to said reversible link by inserting a pin through the upper end of said locking bolt and through said circular hole in the second end of said reversible link.

24. A lock assembly as defined in claim 23 wherein a spring is arranged around said reversible link and is compressibly disposed between said protruding end of said cam follower and said pin.

25. A lock assembly as defined in claim 24 wherein an insert ring is mounted in said cavity of said locking bolt.

26. A lock assembly as defined in claim 25 wherein a notch is formed in said cylindrical periphery of said drum, said notch receiving said insert ring as said drum is rotated.

27. A lock assembly as defined in claim 26 wherein said notch includes a first end and a second end, the first end of said notch corresponding to the engaged position of said locking bolt and the second end of said notch corresponding to the disengaged position of said locking bolt.

28. A lock assembly as defined in claim 27 wherein the second end of said notch includes an engagement ridge which contacts said insert ring and prevents said locking bolt from moving from the disengaged position unless said drum is rotated therefrom.

* * * * *